May 22, 1934. A. M. ERICKSON 1,959,575
FRUIT SLICING MACHINE
Filed March 16, 1933 2 Sheets-Sheet 1
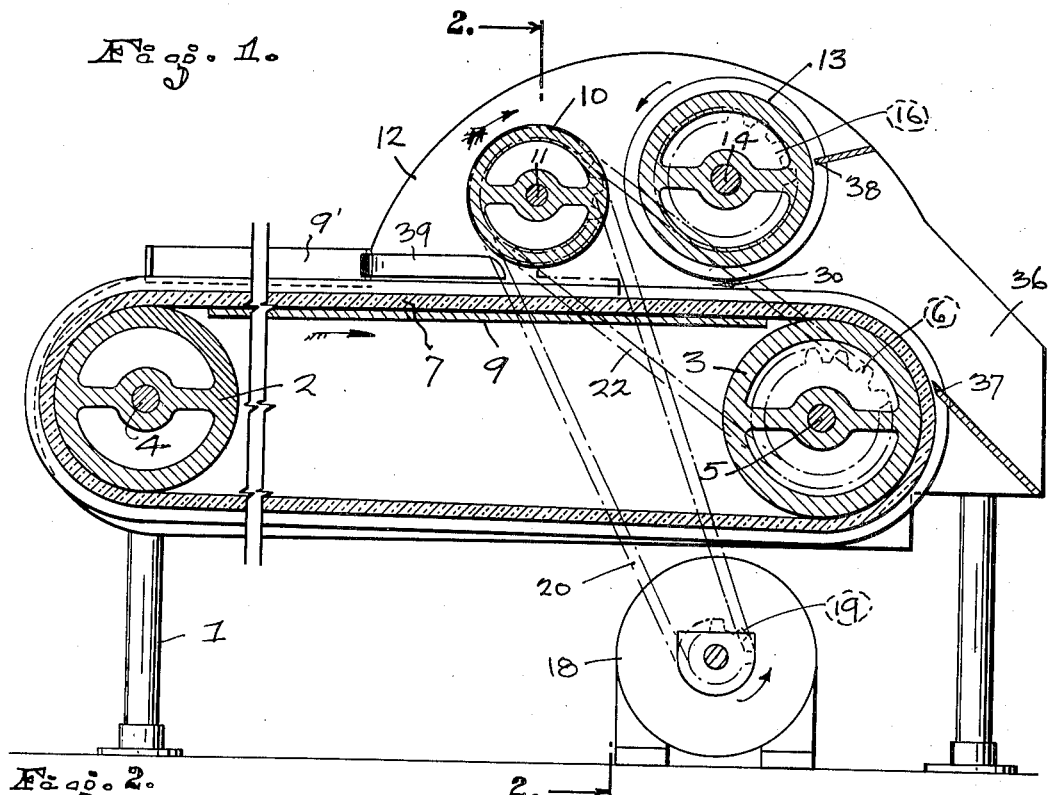
INVENTOR.
ARVID M. ERICKSON
ATTORNEYS.

INVENTOR.
ARVID M. ERICKSON.
BY
ATTORNEYS.

Patented May 22, 1934

1,959,575

UNITED STATES PATENT OFFICE 1,959,575

FRUIT SLICING MACHINE

Arvid M. Erickson, San Jose, Calif., assignor to Barron-Gray Packing Co. Inc., San Jose, Calif., a corporation of California Application March 16, 1933, Serial No. 660,983

8 Claims. (Cl. 146—72)

This invention relates to a slicing apparatus and particularly to a machine for slicing cherries.

The primary object of the invention is to provide a machine for efficiently slicing pitted cherries, or the like materials, into halves, in continuous operation, by the use of a grooved endless belt over which extends a reciprocating knife adapted to cut in half the cherries carried in the grooves of the belt; means being provided to utilize the movement of the belt to feed the cherries toward the cutting knife, and means being provided to eject the sliced cherries, or the like, from the grooves on the belt.

A further object of the invention is to provide a fruit slicing machine in which is provided a grooved endless belt, across which a roller is operatively positioned, said roller having a row of spaced circular knives arranged throughout its length to slice the fruit which passes between the under side of the roller and the upper side of the belt.

A still further object of the invention is to provide a fruit slicing machine consisting of a pair of rollers having their axes arranged on a horizontal plane and the circumferences of said rollers being parallel and grooved so that the fruit to be sliced may be passed between the almost contacting faces of the rollers, a slicing means being provided either on the rollers or on the space between the rollers to cut the fruit.

Other objects and advantages are to provide a machine for slicing cherries or the like materials, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying two sheets of drawings:

Fig. 1 is a vertical section taken through a fruit slicing machine constructed in accordance with my invention.

Fig. 2 is a cross section taken through Fig. 1 on the line 2—2.

Fig. 3 is a plan view of a portion of the machine shown in Fig. 1.

Figure 4:
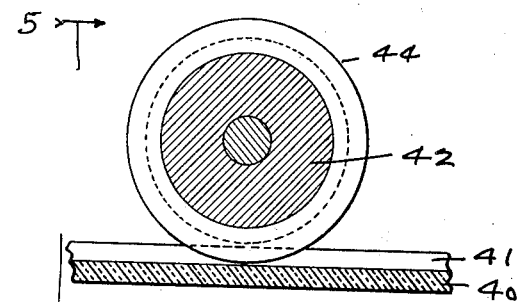
Fig. 4 is a modified form of the invention showing a fruit carrying belt and a roller superimposed over the belt, said roller having cutting knives thereon to cut fruit on the belt that passes beneath the roller.

The hereinafter described slicing machine is particularly adapted to slice maraschino cherries, or other pitted cherries, but is also adapted to be used for slicing other fruits.

In detail the construction illustrated in the drawings comprises a base or frame 1, on which, at opposite ends thereof, the respective pulleys 2 and 3 are rotatably mounted. The pulley 2 is rotatably mounted on a shaft 4, said shaft 4 being fixed, or otherwise suitably mounted on the frame 1. The other pulley 3 is keyed, or otherwise fixed, to a shaft 5 which has its opposite ends journaled in the frame 1. A sprocket 6 is secured to the end of the shaft 5 and a sprocket chain, to be hereinafter described, passes around said sprocket 6 to rotate or drive the pulley 3.

An endless belt 7 is arranged around the spaced pulleys 2 and 3, the outer face of said belt being provided with a series of grooves or channels 8, all of which are spaced an equal distance apart, and all of which extend lengthwise of the belt. The belt is preferably made out of molded rubber, the same being a material which may be kept in a sanitary condition with a minimum of effort.

The upper run of the belt 7 passes over a table or supporting surface 9 which prevents downward deflection of the said upper run of the belt between the pulleys 2 and 3. A table surface 9' is provided on the opposite upper sides of the belt 7 adjacent an end thereof, and from this surface the cherries or other fruit to be pitted may be rolled, preliminary to placing the same on the belt for slicing.

A knurled roller 10 is mounted on a shaft 11 which has its opposite ends journaled in side plates 12, said roller 10 being arranged above and across the upper surface of the grooved belt 7.

A roller 13 which has a series of grooves in its upper circumference, complementing the grooves in the belt 7, is arranged above the upper surface of the belt 7 and rearwardly of the knurled roller 10. The grooved roller 13 is fixed on a shaft 14 which is journaled in the side plates 12. The shaft 11 on which the knurled roller 10 is mounted, is provided with a sprocket 15 at the end thereof, and a sprocket 16 is provided on an end of the shaft 14 on which the grooved roller 13 is mounted.

A driving motor 18 is mounted adjacent the frame 1, one end of the motor shaft having a sprocket 19 thereon which drives thru a sprocket chain 20 to a sprocket 21 on the shaft 11. A second sprocket chain 22 is driven by the sprocket 15 on the shaft 11, and in turn said sprocket chain 22 engages and drives the sprocket 16 on the grooved roller 13 and the sprocket 6 on the pulley 3.

The knurled roller 10 is rotated in a direction opposite to the rotation of the grooved roller 13 in an opposite direction to the path of movement of the grooved belt 7. The knurled roller 10 thus acts as a distributor to prevent the piling up of cherries or the like articles to be pitted, on the front side of said knurled roller, and permits the grooved belt 7 to carry beneath said roller, a single layer of cherries uniformly distributed in the grooves in the belt. A single layer of cherries or like articles thus pass beneath the knurled roller 10, and obviously cherries or like articles, cannot pass below said roller unless the same are confined within one of the grooves on the belt. The roller 10 acts to prevent crushing or bruising of the cherries so that the quality of the fruit is not diminished preliminarily to being halved.

Between the under side of the grooved roller 13 and the upper face of the grooved belt 7, I have provided a knife or blade 30 of approximately the thickness of a hack-saw blade, the opposite ends of said knife being confined in guides 31 on opposite sides of the frame 1, said guides holding the knife in a true horizontal position transversely of the frame. The cutting face of the blade 30 is wavy or undulating so that when it is reciprocated it will effectively slice any objects with which it contacts and will not tear or otherwise mutilate the same.

The knife 30 is reciprocated through a link connection 32 on an end thereof to an eccentric 33 on the end of a shaft 34, which shaft is rotated by a pair of meshing bevel gears 35 driven by the motor 18. Rotation of the eccentric 33 on the end of the shaft 34 imparts a reciprocative movement to the knife 30. The cutting knife 30 is arranged between the grooved roller 13 and the belt 7 at a point where the grooves in the belt and roller complement each other to form practically a complete circle of the diameter of the fruit to be sliced. Thus, during the slicing operation, the cherry or other article is held between the matching grooved faces on the roller and belt, and the cutting knife is permitted to sever the fruit into true halves. The roller 13 and the belt 7 rotate in the same direction, and after the fruit has been sliced by the knife 30, the respective halves are carried outwardly by the movement of the belt 7, to a point where the said halved fruit may be discharged into a chute 36. The edge of the chute adjacent the belt 7 is provided with fingers 37 thereon, which project into the grooves on the belt to scrape out from the grooves, any of the sliced halves of fruit which tend to stick to the belt. In a similar manner a fingered scraper 38 is provided on the frame to project into the grooves on the roller 13 to scrape any cherries or the like fruit therefrom.

A pair of spring guides 39 are connected to the opposite inner sides of the said plates 12 to direct and distribute the cherries to be sliced toward the center of the roller 10 and to prevent cherries from passing between the ends of the roller 10 and the side plates 12.

Figure 5:
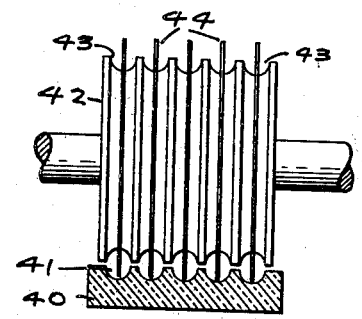
Fig. 5 is a cross section taken through Fig. 4, on the line 5—5.

In Figs. 4 and 5 I have illustrated a modified form of the invention consisting of an endless belt 40 having a series of parallel grooves 41 arranged lengthwise on the upper surface of the belt. The fruit to be cut is adapted to be distributed in the grooves in the belt so that approximately one half of the fruit will project above the upper surface of the belt. A roller 42 is arranged transversely across the belt 40 and the belt and roller are adapted to be moved in the same direction. The roller 42 is provided with a row of grooves 43 throughout the length thereof, and said grooves complement the grooves in the belt to form a complete circle at the points where the grooves in the roller and belt approximately contact.

A series of circular knives 44 are arranged centrally within each of the grooves 43 in the roller, and said circular knives project beyond the circumference of the roller and thus extend into the bottom of the grooves 41 provided on the belt. Fruit that is confined in the grooves in the belt and which is moved by the belt to pass beneath the roller 42, is cut into halves by the circular knife on the roller 42.

Figure 6:
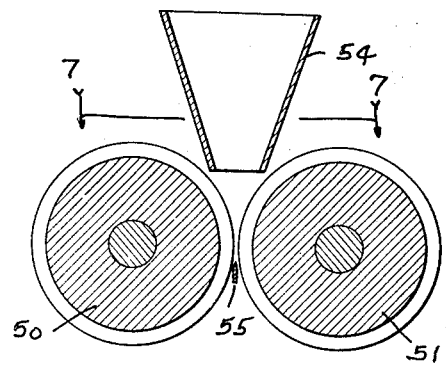
Fig. 6 is a still further modified form of a fruit slicing apparatus consisting of a pair of parallel and horizontally disposed rollers, and grooved to receive the fruit to be cut, and having a cutting knife arranged adjacent the point of approximate contact of the rollers.
Figure 7:
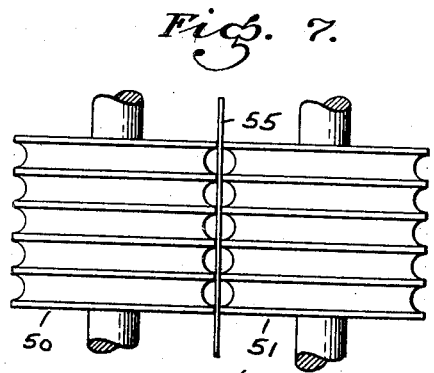
Fig. 7 is a cross section taken through Fig. 6 on the line 7—7.

In the modified form of apparatus shown in Figs. 6 and 7, I provide a pair of parallel rollers 50 and 51, both of which are arranged on a substantially horizontal plane, and both of which are rotated toward each other. The peripheries of the respective rollers are in approximate contact. Each of the rollers 50 and 51 are provided with rows of matching and aligned semi-circular grooves throughout the length thereof. Fruit to be sliced is fed from a hopper 54 above the rollers onto the grooves in the space between the parallel rollers, after which it is carried downwardly between the rollers. At the point of approximate contact of the parallel rollers I have arranged a reciprocating cutting knife 55 which slices into halves the fruit confined in the grooves that passes between the respective rollers.

Figure 8:
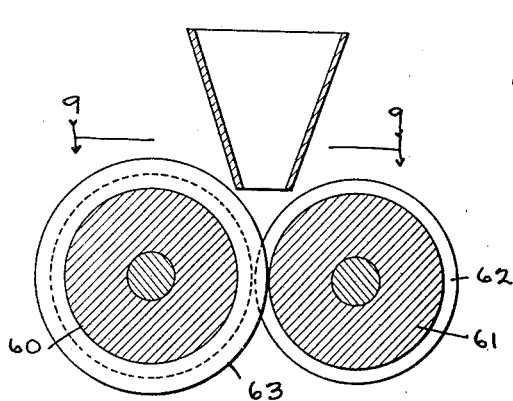
Fig. 8 is a cross section of a modified form of fruit slicing apparatus consisting of a pair of curved and horizontally disposed rollers, one of said rollers having circular cutting knives thereon arranged to cut the fruit that passes within matching grooves in the respective rollers.
Figure 9:
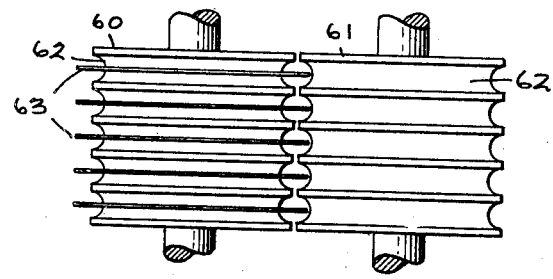
Fig. 9 is a cross section taken through Fig. 8 on the line 9—9.

In the modified form of the device shown in Figs. 8 and 9, I provide a pair of parallel and horizontally disposed rollers 60 and 61, both of which are rotated toward each other. The rollers 60 and 61 approximately contact, and each of said rollers is provided with rows of parallel matching semi-circular grooves throughout the length thereof. The roller 60 is provided with a series of circular cutting knives 63 arranged centrally within the grooves 62 of said roller, and said cutting knives project beyond the circumference of the roller 60 and approximately contact with the base of the grooves 62 in the roller 61. Fruit to be cut is fed into the grooves of the rotating rollers to thereby pass the same between the rollers, and in being passed through said rollers, said fruit is cut or sliced into halves.

Having thus described this invention, what I claim and desire to secure by Letters Patent is:

1. A fruit slicing machine comprising a belt; a roller arranged transversely across and spaced from the upper face of the belt, the belt and roller having complementary longitudinally disposed fruit holding grooves in the face thereof; a reciprocatory cutting knife interposed between the roller and belt to slice fruit confined in all of the grooves of the respective members; and means to move the roller and belt in the same direction.

2. A fruit slicing machine including an endless belt having a roller of parallel grooves arranged lengthwise thereon; a roller positioned in spaced relation transversely across the upper face of the belt, said roller having a series of circumferentially disposed grooves therein complementing the grooves in the belt; means to move the roller and belt in the same direction; a cutting knife arranged between the roller and belt on a plane parallel with the axis of the roller; and means to reciprocate said knife to slice fruit confined in the complementary grooves of the belt and roller.

3. A fruit slicing machine comprising a belt; a roller arranged transversely across and spaced from the upper face of the belt, the belt and roller having complementary fruit holding grooves in the face thereof; a fruit distributing roller positioned transversely above the belt in advance of the grooved roller to distribute fruit in the grooves of said belt preliminarily to passing said fruit into contact with the cutting knife; a reciprocatory cutting knife interposed between the roller and belt to slice fruit confined in the grooves of the respective members; and means to move the roller and belt in the same direction.

4. The combination with a movable endless belt having a series of parallel and longitudinally disposed grooves on its face to carry objects to be sliced, and a laterally disposed reciprocating knife overlying all of the grooves of the belt to slice the objects carried thereagainst; of a table in planar alignment with the belt; and means to guide the objects from the table into the grooves in the belt.

5. A fruit slicing machine comprising a belt; a roller arranged transversely across and spaced from the upper face of the belt, the belt and roller having complementary fruit holding grooves in the face thereof; a reciprocatory cutting knife interposed between the roller and belt to slide fruit confined in the grooves of the respective members; means to move the roller and belt in the same direction; and an ejector projection extended into the grooves in the roller and belt to eject the sliced objects carried thereagainst in the grooves.

6. In a slicing machine, an endles belt having a series of parallel grooves extended longitudinally on its upper face to carry objects to be sliced; a reciprocating knife overlying all of the grooves to slice the said objects as the same are carried against said knife; and a pressure roller having a series of peripheral grooves therein, paralleling the grooves in the belt and arranged above the knife to hold the objects in the grooves as the same are carried against the knife.

7. In a slicing machine, an endless belt having a series of parallel grooves extended lengthwise of its upper face to carry objects to be sliced; a reciprocating knife overlying the grooves to slice the said objects as the same are carried against said knife; a pressure roller having a series of peripheral grooves therein overlying the grooves in the belt and arranged above the knife to hold the objects in the grooves as the same are carried against the knife; and a distributor roller overlying the grooves in the belt immediately in advance of the knife, to distribute the objects in the grooves in the belt preliminarily to carrying said objects against the knife.

8. In a slicing machine, an endless belt having a series of parallel grooves extended lengthwise of its upper face to carry objects to be sliced; a reciprocating knife overlying the grooves to slice the said objects as the same are carried against said knife; a pressure roller having a series of peripheral grooves therein overlying the grooves in the belt and arranged above the knife to hold the objects in the grooves as the same are carried against the knife; a distributor roller overlying the grooves in the belt immediately in advance of the knife, to distribute the objects in the grooves in the belt preliminarily to carrying said objects against the knife; and means to eject the sliced objects from the grooves in the roller and belt.

ARVID M. ERICKSON.